United States Patent
Kerstetter, III et al.

(10) Patent No.: US 7,250,203 B2
(45) Date of Patent: Jul. 31, 2007

(54) AIRSLEEVE

(75) Inventors: Randal Howard Kerstetter, III, Wadsworth, OH (US); Robert Charles Schisler, Munroe Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 219 days.

(21) Appl. No.: 10/687,138

(22) Filed: Oct. 16, 2003

(65) Prior Publication Data

US 2005/0084638 A1    Apr. 21, 2005

(51) Int. Cl.
*B29D 22/00* (2006.01)
*B29D 23/00* (2006.01)
*B32B 1/08* (2006.01)
*F16F 9/04* (2006.01)

(52) U.S. Cl. .......... 428/36.91; 428/36.9; 428/35.7; 267/64.24; 267/64.27

(58) Field of Classification Search ......... 428/36.91, 428/36.9, 35.7, 36.1, 36.2; 267/64.27, 64.24
See application file for complete search history.

(56) References Cited

U.S. PATENT DOCUMENTS

| | | | |
|---|---|---|---|
| 3,586,087 A | 6/1971 | Messerly et al. ........... 152/330 |
| 4,549,593 A | 10/1985 | Yahagi et al. ........... 152/330 R |
| 4,591,617 A | 5/1986 | Berta .................... 525/187 |
| 5,385,980 A | 1/1995 | Schaefer et al. ........... 525/187 |
| 5,484,005 A | 1/1996 | Morehart et al. ........... 152/564 |
| 5,776,294 A | 7/1998 | Nagel .................... 156/307.7 |
| 6,264,178 B1 * | 7/2001 | Schisler et al. ........... 267/64.27 |
| 6,355,719 B1 * | 3/2002 | Corvasce et al. ........... 524/492 |

OTHER PUBLICATIONS

Sartomer Application Bulletin—*Metallic Monomers for Metal Adhesion*—Feb. 1996.
Sartomer Application Bulletin—*Comparison of Rubber Curing Systems Peroxide-Coagent versus Sulfur-Accelerator In Polyisoprene (IR)*—Mar. 2001.
Sartomer Application Bulletin—*Saret® SR-633 & Saret® SR-634 Coagents For Rubber To Metal Adhesion Without Adhesives*—Feb. 2002.
Firestone's Airstroke® Airmount® Technigram No. 110—*Elastomer selection for Firestone Airstroke® actuators/ Airmount® isolators*.
Firestone's Airstroke® Airmount® Technigram No. 110—Super Duty Airstroke® (Epichlorohydren Elastomer).

* cited by examiner

*Primary Examiner*—Michael C. Miggins
(74) *Attorney, Agent, or Firm*—John D. DeLong

(57) ABSTRACT

The present invention is directed to an airsleeve comprising an elastomeric liner; a reinforcing layer overlaying the liner; and an elastomeric cover overlaying the reinforcing layer; the reinforcing layer comprising: i) textile fibers having distributed over surface portions thereof an RFL adhesive; and ii) a plycoat formed from a rubber composition comprising: 100 parts by weight of at least one diene-based elastomer selected from natural rubber (NR), synthetic polyisoprene rubber (IR), butadiene rubber (BR) and styrene-butadiene rubber (SBR); from about 1 to about 40 parts by weight of a metal salt of an α, β-ethylenically unsaturated carboxylic acid, and from about 0.2 to about 5 parts by weight of an organic peroxide.

17 Claims, No Drawings

AIRSLEEVE

FIELD OF THE INVENTION

The present invention is directed to an airsleeve comprising an elastomeric liner; a reinforcing layer overlaying the liner; and an elastomeric cover overlaying the reinforcing layer; the reinforcing layer comprising: i) textile fibers having distributed over surface portions thereof an RFL adhesive; and ii) a plycoat formed from a rubber composition comprising: 100 parts by weight of at least one diene-based elastomer selected from natural rubber (NR), synthetic polyisoprene rubber (IR), butadiene rubber (BR) and styrene-butadiene rubber (SBR); from about 1 to about 40 parts by weight of a metal salt of an α, β-ethylenically unsaturated carboxylic acid, and from about 0.2 to about 5 parts by weight of an organic peroxide.

BACKGROUND OF THE INVENTION

Air springs have been used for motor vehicles and various machines and other equipment for a number of years. The springs are designed to support a suspension load such as a vehicle. The air spring usually consists of a flexible elastomeric reinforced airsleeve that extends between a pair of end members. The airsleeve is attached to end members to form a pressurized chamber therein. The end members mount the air spring on spaced components or parts of the vehicle or equipment on which the air spring is to be mounted. The internal pressurized gas, usually air, absorbs most of the motion impressed upon or experienced by one of the spaced end members. The end members move inwards and towards each other when the spring is in jounce and away and outwards from each other when the spring is in rebound. The design height of the air spring is a nominal position of the spring when the spring is in neither jounce nor rebound.

There have been two basic designs of air springs: a rolling lobe air spring, as seen in U.S. Pat. Nos. 3,043,582 and 5,954,316; and a bellows type air spring, as seen in U.S. Pat. Nos. 2,999,681 and 3,084,952. In a rolling lobe-type air spring, the airsleeve is a single circular-shaped sleeve secured at both ends. During jounce, the airsleeve rolls down the sides of a piston support. In a bellows-type air spring, the multiple meniscus-shaped portions of the airsleeve extend out radially as the spring is in jounce.

Airsleeves have a rubber innerliner, two plies of rubber coated cord fabric, and a rubber cover. These sleeves see their greatest commercial usage in the automotive helper spring market by being mounted as air springs on shock absorbers and struts. Other uses include truck cab suspension springs, truck driver seat springs, automobile air springs, and a variety of industrial air springs.

The plies of cord fabric are contained within a reinforcement layer, which along with the cord fabric includes an elastomeric base, or plycoat, made from a rubber compound. The reinforcement layer may be provided from a plurality of different types of materials. The rubber compound of the plycoat is selected from among elastomers conventionally used in manufacturing airsleeves, and blends of such elastomers. Also typically included in the rubber compound are various additives.

In the manufacture of fabric-reinforced, molded rubber articles such as airsleeves, it is desirable to obtain strong adhesion between the fabric and the rubber, and also high resistance to deterioration of the bond with flexing of the structure.

The adhesion of the plycoat to the cover is essential for acceptable performance of composites in applications such as airsleeves. Further, the adhesion of the reinforcing cord to the plycoat is essential for field performance, especially for its high stress tolerance. An adhesive based on a styrene-butadiene rubber (SBR) latex, a vinylpyridine/styrene/butadiene terpolymer latex, and a resorcinol/formaldehyde condensate is typically used to adhere the cord to the plycoat.

The rubber compounds used in the air spring cover are dictated largely by the operating environment to which the air spring is exposed. For airsleeves exposed to a high temperature operating environment, up to about 115° C., an epichlorohydrin rubber (ECO) based compound may be used for the cover, along with a sulfur-cured natural rubber plycoat compound. While this combination of an ECO cover with a sulfur-cured natural rubber plycoat provides adequate service life in some applications, automotive specifications require increasingly better performance from airsleeves.

SUMMARY OF THE INVENTION

The present invention is directed to an airsleeve comprising an elastomeric liner; a reinforcing layer overlaying the liner; and an elastomeric cover overlaying the reinforcing layer; the reinforcing layer comprising: i) textile fibers having distributed over surface portions thereof an RFL adhesive; and ii) a plycoat formed from a rubber composition comprising: 100 parts by weight of at least one diene-based elastomer selected from natural rubber (NR), synthetic polyisoprene rubber (IR), butadiene rubber (BR) and styrene-butadiene rubber (SBR); from about 1 to about 40 parts by weight of a metal salt of an α, β-ethylenically unsaturated carboxylic acid, and from about 0.2 to about 5 parts by weight of an organic peroxide.

DESCRIPTION OF THE INVENTION

In one embodiment, the present invention is directed to an airsleeve comprising an elastomeric liner; a reinforcing layer overlaying the liner; and an elastomeric cover overlaying the reinforcing layer; the reinforcing layer comprising: i) textile fibers having distributed over surface portions thereof an RFL adhesive; and ii) a plycoat formed from a rubber composition comprising: 100 parts by weight of at least one diene-based elastomer selected from natural rubber (NR), synthetic polyisoprene rubber (IR), butadiene rubber (BR) and styrene-butadiene rubber (SBR); from about 1 to about 40 parts by weight of a metal salt of an α, β-ethylenically unsaturated carboxylic acid, and from about 0.2 to about 5 parts by weight of an organic peroxide.

The reinforcing layer includes a plycoat comprising a curable rubber composition. In one embodiment, the curable or vulcanizable rubber composition may include 100 parts by weight of at least one diene-based elastomer selected from natural rubber (NR), synthetic polyisoprene rubber (IR), butadiene rubber (BR) and styrene-butadiene rubber (SBR). In another embodiment, the rubber composition may include 50 to 95 parts by weight of natural rubber (NR) and 5 to 50 parts by weight of synthetic polyisoprene rubber (IR) or butadiene rubber (BR).

The plycoat rubber composition also includes an organic peroxide. Well-known classes of peroxides that may be used include diacyl peroxides, peroxyesters, dialkyl peroxides and peroxyketals. Specific examples include dicumyl peroxide, n-butyl-4,4-di(t-butylperoxy) valerate, 1,1-di(t-butylperoxy)-3,3,5-trimethylcyclohexane, 1,1-di(t-butylperoxy) cyclohexane, 1,1-di(t-amylperoxy) cyclohexane, ethyl- 3,3-di(t-butylperoxy) butyrate, ethyl-3,3-di(t-amylperoxy) butyrate, 2,5-dimethyl-2,5-di(t-butylperoxy) hexane, t-butyl cumyl peroxide, $\alpha\alpha'$-bis(t-butylperoxy)diisopropylbenzene, di-t-butyl peroxide, 2,5-dimethyl-2,5-di(t-butylperoxy) hexyne-3, t-butyl perbenzoate, 4-methyl-4-t-butylperoxy-2-pentanone and mixtures thereof. The preferred peroxide is dicumyl peroxide. Typical amounts of peroxide ranges from 0.2 to 5 phr (based on active parts of peroxide). Preferably, the amount of peroxide ranges from 0.3 to 3 phr. More preferably, the amount of peroxide ranges from 0.3 to 1.5 phr.

The plycoat rubber composition also includes a metal salt of an $\alpha,\beta$-ethylenically unsaturated carboxylic acid. The metal salts of $\alpha$, $\beta$-ethylenically unsaturated carboxylic acids include the metal salts of acids including acrylic, methacrylic, maleic, fumaric, ethacrylic, vinyl-acrylic, itaconic, methyl itaconic, aconitic, methyl aconitic, crotonic, alpha-methylcrotonic, cinnamic and 2,4-dihydroxy cinnamic acids. The metals may be zinc, cadmium, calcium, magnesium, sodium or aluminum. In one embodiment, the metal salt of an $\alpha$, $\beta$-ethylenically unsaturated carboxylic acid may be zinc diacrylate or zinc dimethacrylate. In one embodiment, the concentration of metal salt of an $\alpha$, $\beta$-ethylenically unsaturated carboxylic acid is from about 1 to about 40 phr. In another embodiment, the concentration metal salt of an $\alpha$, $\beta$-ethylenically unsaturated carboxylic acid is from about 5 to about 20 phr.

As will be demonstrated, the presence of sulfur in the plycoat may interfere with adhesion of the plycoat to the cover. For this reason, it is generally preferable to have no sulfur in the plycoat. However, small amounts of sulfur and usual cure accelerators may be used in the plycoat to assist in curing. The amount of sulfur should be low enough not to interfere with the adhesion of the plycoat to the cover. Preferably, the amount of sulfur in the plycoat is less than 1 phr and more preferably less than 0.5 phr, and even more preferably to have no sulfur.

The term "phr" as used herein, and according to conventional practice, refers to "parts by weight of a respective material per 100 parts by weight of rubber, or elastomer".

It is readily understood by those having skill in the art that the plycoat rubber composition would be compounded by methods generally known in the rubber compounding art, such as mixing the rubbers with various commonly used additive materials such as, for example, curing aids, activators, retarders, processing oils, resins, reinforcing resins, tackifying resins, plasticizers, fillers, pigments, fatty acids, zinc oxide, magnesium oxide, waxes, antioxidants, antiozonants and peptizing agents. As known to those skilled in the art, the additives mentioned above are selected and commonly used in conventional amounts. Typical amounts of reinforcing-type carbon blacks(s) comprise about 20 to 100 phr. Representative examples of such carbon blacks include N110, N121, N220, N231, N234, N242, N293, N299, N330, N339, N343, N347, N351, N358, N375, N550, N660, N683, N754, N762, N765, N774, N907, N908, N990 and N991. Various non-carbon black fillers and/or reinforcing agents may be added to the plycoat composition. An example of a reinforcing agent is silica. Silica may be used in the present composition in amounts from about 0 to 80 parts, and preferably about 10 to 20 parts, by weight based on 100 parts of rubber. In one embodiment, the plycoat composition may include from about 30 to about 60 phr of filler selected from carbon black and silica. Typical amounts of processing oils comprise about 1 to about 50 phr. Such processing oils can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344-346. Typical amounts of antiozonants comprise about 1 to 5 phr. Typical amounts of fatty acids (such as stearic acid and oleic acid) are used in an amount ranging from about 0.2 to about 3 phr. Typical amounts of zinc oxide comprise about 0.5 to about 8 phr. Typical amounts of magnesium oxide ranges from 0 to 1.0 phr. Typical amounts of waxes comprise about 1 to about 5 phr. Often microcrystalline waxes are used.

The mixing of the plycoat rubber composition can be accomplished by methods known to those having skill in the rubber mixing art. For example, the ingredients are typically mixed in at least two stages, namely at least one non-productive stage followed by a productive mix stage. The final curatives including peroxides and co-agents are typically mixed in the final stage which is conventionally called the "productive" mix stage in which the mixing typically occurs at a temperature, or ultimate temperature, lower than the mix temperature(s) of the preceding non-productive mix stage(s). The rubber and carbon black, if used, may be mixed in one or more non-productive mix stages. The terms "non-productive" and "productive" mix stages are well known to those having skill in the rubber mixing art.

The reinforcing layer includes, along with the plycoat, textile fibers treated with an RFL type adhesive dip. Textile fibers in the form of suitable cord or fabric may be in various forms, including woven fabrics, knitted fabric, or spun bonded fabric, and fiber cord. The cord or fabric may be comprised of various materials typically used as reinforcement in composite materials, including rayon, nylon, polyester, aramid, cotton, and combinations thereof. In one embodiment, the cord or fabric is nylon or polyester.

The reinforcing layer includes an adhesive composition useful in adhering textile fibers to the plycoat. In one embodiment, the so-called RFL adhesive composition may be comprised of resorcinol, formaldehyde, and one or more polymer latexes. In one embodiment, the polymer latex may include one or more of styrene-butadiene copolymer latex, vinylpyridine-styrene-butadiene terpolymer latex, or latexes made from polymers included in the plycoat, liner, or cover compositions.

The RFL adhesive dip is, in general, used in the form of an aqueous latex. The latices are prepared by free radical emulsion polymerization of styrene and butadiene to form a copolymer latex, and free radical emulsion polymerization of styrene, butadiene, and vinylpyridine to form a terpolymer latex. The charge compositions used in the preparation of the latices contain monomers, at least one surfactant, and at least one free radical initiator. Such latices are well known, and a suitable RFL dip may be made by any of various methods as are known in the art, for example, following the teaching of U.S. Pat. No. 3,525,703.

The RFL adhesive may optionally include a blocked isocyanate. In one embodiment from about 1 to about 20 parts by solid of blocked isocyanate is added to the adhesive. The blocked isocyanate may be any suitable blocked isocyanate known to be used in RFL adhesive dips including, but not limited to, caprolactam blocked methylene-bis-(4-phenylisocyanate), such as Grilbond-IL6 available from EMS American Grilon, Inc, and phenolformaldehyde blocked isocyanates as disclosed in U.S. Pat. Nos. 3,226,276; 3,268, 467; and 3,298,984.

In accordance with this invention, the cord or fabric to be treated is dipped for one to three minutes in the RFL dip, and dried at a temperature within the range of about 75° C. to about 265° C. for about 0.5 minutes to about 20 minutes, and thereafter calendered into the plycoat rubber compound and cured therewith. The dip process may be carried out in one or two steps. Adjustment of the solids content of the dips for a one or two-step dipping process is done as required, as is known to one skilled in the art.

The airsleeve further includes an elastomeric liner and an elastomeric cover. The liner and cover may each comprise vulcanizable rubber compounds; the compounds used in the liner may be the same as that used in the cover, or it may be different. Elastomers that may be used in the liner and cover compounds include at least one elastomer selected from among elastomers conventionally used in manufacturing airsleeves included, but not limited to, elastomers such as epichlorohydrin rubber, polyisobutylene, halogenated butyl rubbers, natural rubber, polyisoprene, polybutadiene, styrene-butadiene, and blends of such elastomers. In one embodiment, the liner or cover compounds may include epichlorohydrin rubber, chlorinated butyl rubber, or brominated butyl rubber. In another embodiment, the liner or cover may include epichlorohydrin rubber and a halogenated rubber selected from chlorinated butyl rubber and brominated butyl rubber. The liner and cover compounds may include any of various additives and fillers as in the plycoat compound.

Epichlorohydrin rubber suitable for use includes (1) homopolymers of epichlorohydrin, (2) copolymers of an epiochlorohydrin with less than 30% of saturated epoxy monomers or with an unsaturated epoxy monomer, and (3) terpolymers of an epichlorohydrin with (a) less than 30% of a saturated epoxy monomer or mixtures thereof, (b) an unsaturated epoxy monomer or mixtures thereof, or (c) mixtures of (a) and (b). The epichlorohydrin polymers are prepared by polymerizing a monomeric epichlorohydrin alone or together with one or more of the aforementioned epoxy monomers with a suitable catalyst, such as an organometallic catalyst. For example, a reaction product of water with an alkyl aluminum compound is a suitable organometallic catalyst. Typical saturated epoxy monomers include alkylene oxides, such as ethylene oxide, and typical unsaturated epoxy monomers include allylglycidyl ether. The properties and the preparation of epichlorohydrin polymers suitable for use in the practice of this invention are known in the art and are described, for example, in U.S. Pat. No. 3,158,500, the disclosure of which is incorporated herein by reference.

Suitable chlorinated butyl rubber may be considered part of a larger group of halogenated isobutylene rubbers. By the term "halogenated isobutylene rubber" is meant a halogenated polymer comprising isobutylene sub-units. Halogens include chlorine and bromine. The halogenated rubbers used in this invention include polymers bearing halogen atoms incorporated before or after polymerization.

The halogenated isobutylene rubbers used in this invention include, but are not limited to, brominated butyl rubber (commonly called bromobutyl and abbreviated BIIR where isoprene is the diene copolymerized with isobutylene; as used herein, the term "butyl rubber" means a copolymer of isobutylene and a diene such as isoprene); chlorinated butyl rubber (commonly called chlorobutyl and abbreviated CIIR where isoprene is the diene copolymerized with isobutylene); so-called star-branched polyisobutylene comprising branched or star-shaped polyisobutylene sub-units, such as star-branched bromobutyl and star-branched chlorobutyl; isobutylene-bromomethylstyrene copolymers such as isobutylene/meta-bromomethylstyrene and isobutylene/para-bromomethylstyrene, isobutylene/chloromethylstyrene copolymers such as isobutylene/meta-chloromethylstyrene and isobutylene/parachloromethylstyrene, and the like, including and mixtures thereof.

The halogenated isobutylene rubbers also include halogenated isobutylene containing terpolymers, such as halogenated isobutylene/styrene/dienes; e.g., isobutylene/styrene/isoprene and halogenated isobutylene/methylstyrene/dienes; e.g., isobutylene/methylstyrene/isoprene; isobutylene/halomethylstyrene/diene terpolymers including isobutylene/bromomethylstyrene/isoprene; isobutylene/haloisobutylene/dienes, including isobutylene/bromobutylene/isoprene; and the like, and mixtures thereof with other halogenated isobutylene rubbers.

Vulcanization of the airsleeve is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air. Such composites can be built, shaped, molded and cured by various methods which are known and will be readily apparent to those having skill in such art. Methods for making airsleeves are described in U.S. Pat. Nos. 3,794,538 and 6,264,178, fully incorporated herein by reference.

The airsleeve may be used in any of various airspring applications including truck cab suspension springs, truck driver seat springs, automobile air springs, and a variety of industrial air springs. These air springs may be of various designs including, but not limited to, a rolling lobe air spring, for example as in U.S. Pat. Nos. 3,043,582 and 5,954,316, fully incorporated herein by reference, and a bellows type air spring, for example as in U.S. Pat. Nos. 2,999,681 and 3,084,952, fully incorporated herein by reference.

The invention is further illustrated by the following non-limiting example.

EXAMPLE

Plycoat compounds were prepared according to Table 1 and a cover compound containing epichlorohydrin rubber and chlorobutyl rubber was prepared as indicated in Table 2, with amounts in parts per hundred rubber (phr). Plycoat test samples were prepared using samples 1-8 and tested for physical properties as indicated in Table 3. Plycoat/cover samples and plycoat/fabric samples were prepared using samples 1-8, and tested for adhesion as indicated in Table 3. Tests were done according to the following protocols:

Rheometer
 ODR at 150° C. (302° F.), ASTM D2048
 Mooney Scorch at 121° C. (250° F.), ASTM D1646

Tensile, Elongation, and Hardness
 Original, ASTM D412, dumbbell specimens

Adhesion to ECO/CIIR cover compound, ASTM D413
 Original, using machine method with type A, 180° peel, strip specimens.

Adhesion to RFL-Dipped nylon fabric, ASTM D413
 Original, using machine method with type A, 180° peel, strip specimens.

Other
 Die C tear, ASTM D624

TABLE 1

| Sample | 1 | 2 | 3 | 4 | 5 | 6 | 7 | 8 |
|---|---|---|---|---|---|---|---|---|
| Natural Rubber[1] | 50 | 90 | 50 | 90 | 50 | 90 | 50 | 90 |
| Polybutadiene[2] | 50 | 0 | 50 | 0 | 50 | 0 | 50 | 0 |
| Synthetic polyisoprene[3] | 0 | 10 | 0 | 10 | 0 | 10 | 0 | 10 |
| Carbon black[4] | 45 | 45 | 25 | 25 | 45 | 45 | 25 | 25 |
| Silica | 0 | 0 | 15 | 15 | 0 | 0 | 15 | 15 |
| Napthenic oil | 4 | 4 | 4 | 4 | 4 | 4 | 4 | 4 |
| Stearic acid | 1 | 1 | 1 | 1 | 1 | 1 | 1 | 1 |
| Zinc oxide | 5 | 5 | 5 | 5 | 5 | 5 | 5 | 5 |
| 40% dicumyl peroxide | 2 | 2 | 2 | 2 | 2 | 2 | 2 | 2 |

TABLE 1-continued

| Sample | 1 | 2 | 3 | 4 | 5 | 6 | 7 | 8 |
|---|---|---|---|---|---|---|---|---|
| 75% zinc diacrylate | 9.33 | 13.33 | 13.33 | 9.33 | 13.33 | 9.33 | 9.33 | 13.33 |
| Sulfur | 0 | 0 | 0 | 0 | 1.4 | 1.4 | 1.4 | 1.4 |
| TBBS | 0 | 0 | 0 | 0 | 1 | 1 | 1 | 1 |

[1]SMR20
[2]Budene ® 1207, high cis-polybutadiene from The Goodyear Tire & Rubber Company
[3]Natsyn ® 2200, from The Goodyear Tire & Rubber Company
[4]N550

TABLE 2

| ECO[1] | 70 |
|---|---|
| CIIR[2] | 30 |
| Carbon black[3] | 40 |
| Stearic acid | 2 |
| Resins[4] | 6 |
| Process aids[5] | 3 |
| Zinc oxide | 2.25 |
| Sulfur | 0.7 |
| Accelerators[6] | 2.54 |

[1]Hydrin T3000L, Zeon Chemical Co.
[2]HT-10-66, ExxonMobil Chemical Co.
[3]N550
[4]aromatic hydrocarbon and non-reactive phenol-formaldehyde types
[5]fatty acid derivative type
[6]thiazole and thiuram types

TABLE 3

| Sample | 1 | 2 | 3 | 4 | 5 | 6 | 7 | 8 |
|---|---|---|---|---|---|---|---|---|
| Mooney Scorch, MS@121° C., 30 minutes | | | | | | | | |
| Minimum Viscosity | 27.7 | 22.8 | 27.2 | 22.4 | 27.1 | 22.8 | 27.2 | 21.4 |
| Time to 5 pt. Rise, Mins. | 12.9 | 17.4 | 13.7 | 17.3 | 20.1 | 21.7 | 18.6 | 25.8 |
| Rheometer, ODR, 150° C. | | | | | | | | |
| $T_{50}$ | 10.6 | 14.0 | 12.3 | 12.0 | 12.7 | 9.4 | 12.5 | 12.5 |
| $T_{90}$ | 32.5 | 38.0 | 35.4 | 35.9 | 36.8 | 28.3 | 36.5 | 36.2 |
| Time to 1 pt. Rise, Mins. | 1.7 | 2.4 | 2.0 | 2.3 | 2.6 | 2.7 | 2.7 | 3.1 |
| Maximum Torque | 52.7 | 40.7 | 53.6 | 36.1 | 44.7 | 37.8 | 41.8 | 34.5 |
| Minimum Torque | 8.5 | 6.7 | 8.9 | 6.6 | 8.5 | 6.1 | 8.5 | 6.0 |
| Rheometer, MDR, 191° C. | | | | | | | | |
| $T_{50}$ | 0.44 | 0.44 | 0.45 | 0.46 | 0.59 | 0.56 | 0.59 | 0.6 |
| $T_{90}$ | 0.87 | 0.76 | 0.88 | 0.82 | 1.15 | 0.93 | 1.1 | 1.05 |
| Time to 2 pt. Rise, Mins. | 0.29 | 0.34 | 0.3 | 0.37 | 0.38 | 0.41 | 0.39 | 0.45 |
| Maximum Torque | 18.9 | 10.9 | 20.3 | 9.6 | 14.8 | 11.7 | 13.9 | 10.5 |
| Minimum Torque | 2.15 | 1.65 | 2.07 | 1.68 | 1.95 | 1.6 | 1.96 | 1.49 |
| Original Properties | | | | | | | | |
| Tensile (MPa) | 13.0 | 20.8 | 15.1 | 21.5 | 17.2 | 21.2 | 16.4 | 23.1 |
| Elongation (%) | 204 | 327 | 253 | 392 | 462 | 484 | 530 | 558 |
| Modulus @ 50% | 2.01 | 1.54 | 2.16 | 1.23 | 1.48 | 1.35 | 1.27 | 1.18 |
| Modulus @ 100% | 4.72 | 3.78 | 4.70 | 2.63 | 2.67 | 2.65 | 2.02 | 2.01 |
| Modulus @ 200% | 12.74 | 12.13 | 11.97 | 8.54 | 6.54 | 6.93 | 4.39 | 4.97 |
| Modulus @ 300% | — | 19.70 | — | 15.57 | 10.88 | 12.80 | 7.58 | 9.13 |
| Hardness (Shore A) | 69 | 64 | 70 | 58 | 65 | 63 | 62 | 60 |
| Fabric Adhesion, RFL-Dipped Nylon Fabric | | | | | | | | |
| Adhesion 1 (N/25 mm) | 205 | 325 | 76 | 231 | 102 | 125 | 343 | 147 |
| Adhesion 2 | 223 | 360 | 116 | 209 | 107 | 120 | 396 | 151 |
| Avg. Adhesion | 214 | 343 | 96 | 220 | 105 | 122 | 369 | 149 |
| Compound Adhesion, ECO/CIIR Blend | | | | | | | | |
| Adhesion 1 (N/25 mm) | 240 | 320 | 236 | 169 | 116 | 165 | 102 | 160 |
| Adhesion 2 | 231 | 307 | 316 | 165 | 111 | 174 | 98 | 169 |
| Avg. Adhesion | 236 | 314 | 276 | 167 | 113 | 169 | 100 | 165 |

The data of Tables 1, 2 and 3 illustrate that samples made according to the present invention surprisingly and unexpectedly showed significantly higher adhesion to an elastomeric cover compound than did samples made otherwise.

While certain representative embodiments and details have been shown for the purpose of illustrating the invention, it will be apparent to those skilled in this art that various changes and modifications may be made therein without departing from the spirit or scope of the invention.

What is claimed is:

1. An airsleeve comprising an elastomeric liner; a reinforcing layer overlaying the liner; and an elastomeric cover overlaying the reinforcing layer; the reinforcing layer comprising: i) textile fibers having distributed over surface portions thereof an RFL adhesive; and ii) a plycoat formed from a rubber composition consisting of: 100 parts by weight of at least one diene-based elastomer selected from the group consisting of natural rubber (NR), synthetic polyisoprene rubber (IR), butadiene rubber (BR) and styrene-butadiene rubber (SBR); from about 1 to about 40 parts by weight of a metal salt of an α, β-ethylenically unsaturated carboxylic acid; at least one additive selected from the group consisting of process oils, carbon black, silica, zinc oxide, fatty acids, sulfur, and cure accelerators; and from about 0.2 to about 5 parts by weight of an organic peroxide; wherein at least one of the elastomeric liner and elastomeric cover comprises at least one rubber selected from the group consisting of epichlorohydrin rubber (ECO), brominated butyl rubber (BIIR) and chlorinated butyl rubber (CIIR).

2. The airsleeve of claim 1, wherein the amount of a metal salt of an α, β-ethylenically unsaturated carboxylic acid ranges from about 5 to about 20 parts by weight.

3. The airsleeve of claim 1, wherein the amount of organic peroxide ranges from 0.3 to 3 parts by weight.

4. The airsleeve of claim 1, wherein the elastomer consists of 50 to 95 parts by weight of natural rubber and 5 to 50 parts by weight of a rubber selected from synthetic polyisoprene, butadiene rubber and styrene-butadiene rubber.

5. The airsleeve of claim 1, wherein said textile fibers are selected from the group consisting of woven fabrics, knitted fabric, or spun bonded fabric, and fiber cord.

6. The airsleeve of claim 1, wherein said textile fibers comprise a material selected from the group consisting of rayon, nylon, polyester, aramid, cotton, and combinations thereof.

7. The airsleeve of claim 1, wherein textile fibers comprise nylon.

8. The airsleeve of claim 1 wherein said airsleeve is a component of a manufactured item selected from shock absorbers, struts, truck cab suspension springs, truck driver seat springs, automobile air springs, and industrial air springs.

9. An air spring comprising the airsleeve of claim 1.

10. The airsleeve of claim 1, wherein said RFL comprises resorcinol, formaldehyde, and at least one polymer selected from styrene-butadiene copolymer and vinylpyridene-styrene-butadiene terpolymer.

11. An air spring comprising the airsleeve of claim 1, wherein the air spring is a bellows type air spring.

12. An air spring comprising the airsleeve of claim 1, wherein the airspring is a rolling lobe air spring.

13. The airsleeve of claim 1, wherein the amount of filler selected from carbon black and silica ranges from about 30 to about 60 parts by weight.

14. The airsleeve of claim 1, wherein the organic peroxide is selected from include dicumyl peroxide, n-butyl-4,4-di(t-butylperoxy) valerate, 1,1-di(t-butylperoxy)-3,3,5-trimethylcyclohexane, 1,1-di(t-butylperoxy) cyclohexane, 1,1-di(t-amylperoxy) cyclohexane, ethyl-3,3-di(t-butylperoxy) butyrate, ethyl-3,3-di(t-amylperoxy) butyrate, 2,5-dimethyl-2,5-di(t-butylperoxy) hexane, t-butyl cumyl peroxide, αα'-bis(t-butylperoxy)diisopropylbenzene, di-t-butyl peroxide, 2,5-dimethyl-2,5-di(t-butylperoxy) hexyne-3, t-butyl perbeuzoate, 4-methyl-4-t-butylperoxy-2-pentanone and mixtures thereof.

15. The airsleeve of claim 1, wherein the amount of natural rubber is 50 to 100 parts by weight and the amount of synthetic polyisoprene is 0 to 50 parts by weight.

16. An airsleeve comprising:
an elastomenc liner;
a reinforcing layer overlaying the liner;
and an elastomeric cover overlaying the reinforcing layer;
the reinforcing layer comprising:
  i) textile fibers having distributed over surface portions thereof an RFL adhesive; and
  ii) a plycoat formed from a rubber composition consisting of:
    50 to 100 parts by weight of natural rubber (NR);
    0 to 50 parts by weight of synthetic polyisoprene rubber (IR) or butadiene rubber (BR);
    from about 5 to about 20 parts by weight of a metal salt of an α, β-ethylenically unsaturated carboxylic acid;
    from about 0.2 to about 5 parts by weight of an organic peroxide;
    from about 30 to about 60 parts by weight of a filler selected from carbon black and silica; and
    at least one additive selected from the group consisting of process oils, carbon black, silica, zinc oxide, fatty acids, sulfur, and cure accelerators;
the cover comprising epichlorohydrin rubber (ECO) and optionally chlorinated butyl rubber (CIIR).

17. The airsleeve of claim 1, wherein the metal salt of an α, β-ethylenically unsaturated carboxylic acid is selected from the group consisting of zinc diacrylate and zinc dimethacrylate.

* * * * *